US012565427B2

(12) United States Patent (10) Patent No.: US 12,565,427 B2
Suman (45) Date of Patent: Mar. 3, 2026

(54) APPARATUS AND PROCESS FOR CONVERSION OF AMMONIA INTO OXIDES OF NITROGEN

(71) Applicant: DEEPAK NITRITE LIMITED, Gujarat (IN)

(72) Inventor: Sanjay Kumar Suman, Gujarat (IN)

(73) Assignee: DEEPAK NITRITE LIMITED, Vadodara (IN)

( * ) Notice: Subject to any disclaimer, the term of this patent is extended or adjusted under 35 U.S.C. 154(b) by 860 days.

(21) Appl. No.: 17/428,626

(22) PCT Filed: Jan. 27, 2020

(86) PCT No.: PCT/IB2020/050591
§ 371 (c)(1),
(2) Date: Aug. 4, 2021

(87) PCT Pub. No.: WO2020/161558
PCT Pub. Date: Aug. 13, 2020

(65) Prior Publication Data
US 2022/0135407 A1 May 5, 2022

(30) Foreign Application Priority Data
Feb. 7, 2019 (IN) .............................. 201921004836

(51) Int. Cl.
*C01B 21/50* (2006.01)
*B01J 35/58* (2024.01)
(Continued)

(52) U.S. Cl.
CPC ............ *C01B 21/28* (2013.01); *C01B 21/265* (2013.01); *C01B 21/36* (2013.01); *C01B 21/50* (2013.01); *B01J 35/58* (2024.01)

(58) Field of Classification Search
None
See application file for complete search history.

(56) References Cited

U.S. PATENT DOCUMENTS 2,032,699 A * 3/1936 Hayes ..................... C01B 21/50
23/296
2,192,816 A 3/1940 Laury et al.
(Continued)

FOREIGN PATENT DOCUMENTS

CN 2503056 Y * 7/2002
CN 101696024 A 4/2010
(Continued)

OTHER PUBLICATIONS

Weisstein, Eric. W. "SOHCAHTOA." From MathWorld—A Wolfram Web Resource. Retrieved from <mathworld.wolfram.com/SOHCAHTOA> on Jan. 28, 2025 (Year: 2025).*
(Continued)

*Primary Examiner* — Jennifer A Leung

(57) ABSTRACT

Disclosed is an apparatus for conversion of ammonia into oxides of nitrogen which may comprise an adiabatic burner (108), a set of platinum/rhodium alloy catalytic gauzes (102A), (102B), and (102C), a waste heat recovery boiler (WHRB) (110), an absorption tower (302A), (302B), (302C), (302D) and (302E), a NaOH tank (306) and a surge tank (304). Further, the adiabatic burner may be configured to carry out catalytic oxidation of air and ammonia, using catalytic gauzes (102A), (102B), and (102C) of platinum/ rhodium alloy. Further, the mixture of air and ammonia may be selectively oxidized to oxides of nitrogen, which may be absorbed in an alkali medium in the absorption tower (302A), (302B), (302C), (302D) and (302E), to yield sodium nitrites and nitrates.

5 Claims, 4 Drawing Sheets

(51) Int. Cl.

| | | |
|---|---|---|
| *C01B 21/26* | (2006.01) | |
| *C01B 21/28* | (2006.01) | |
| *C01B 21/36* | (2006.01) | |

(56) References Cited

U.S. PATENT DOCUMENTS

| | | | | |
|---|---|---|---|---|
| 2,782,107 | A | * | 2/1957 | Inman .................... B01J 8/0453 |
| | | | | 422/198 |
| 6,073,467 | A | * | 6/2000 | Blass ....................... B01J 35/58 |
| | | | | 66/196 |
| 6,649,137 | B2 | * | 11/2003 | Bergeron ............. B01J 19/0066 |
| | | | | 423/376 |
| 8,133,458 | B2 | | 3/2012 | Fareid |
| 2002/0127932 | A1 | * | 9/2002 | Neumann .............. B01J 23/464 |
| | | | | 442/6 |
| 2010/0098603 | A1 | * | 4/2010 | Fareid .................... B01J 8/0278 |
| | | | | 422/600 |
| 2022/0241739 | A1 | * | 8/2022 | Suman ............. B01F 25/31241 |

FOREIGN PATENT DOCUMENTS

| | | | | | |
|---|---|---|---|---|---|
| CN | 202284148 | U | | 6/2012 | |
| CN | 203095633 | U | | 7/2013 | |
| CN | 102847433 | B | | 8/2015 | |
| FR | 2601938 | A3 | * | 1/1988 | ............ B01J 12/005 |
| GB | 1176697 | A | | 1/1970 | |
| HU | 203850 | B | * | 10/1991 | ............ B01D 53/56 |
| RU | 2174096 | C1 | | 9/2001 | |
| WO | WO-2004096703 | A2 | * | 11/2004 | .............. B01J 23/40 |
| WO | WO-2018052304 | A1 | * | 3/2018 | .............. C01B 21/26 |

OTHER PUBLICATIONS

Maroof a Shah; Donald Roberts "Mass Transfer Characteristics of Stacked Metal Screens", Publication date: Jun. 1, 1975.

* cited by examiner

200

104

104A     104B     104C

106

400

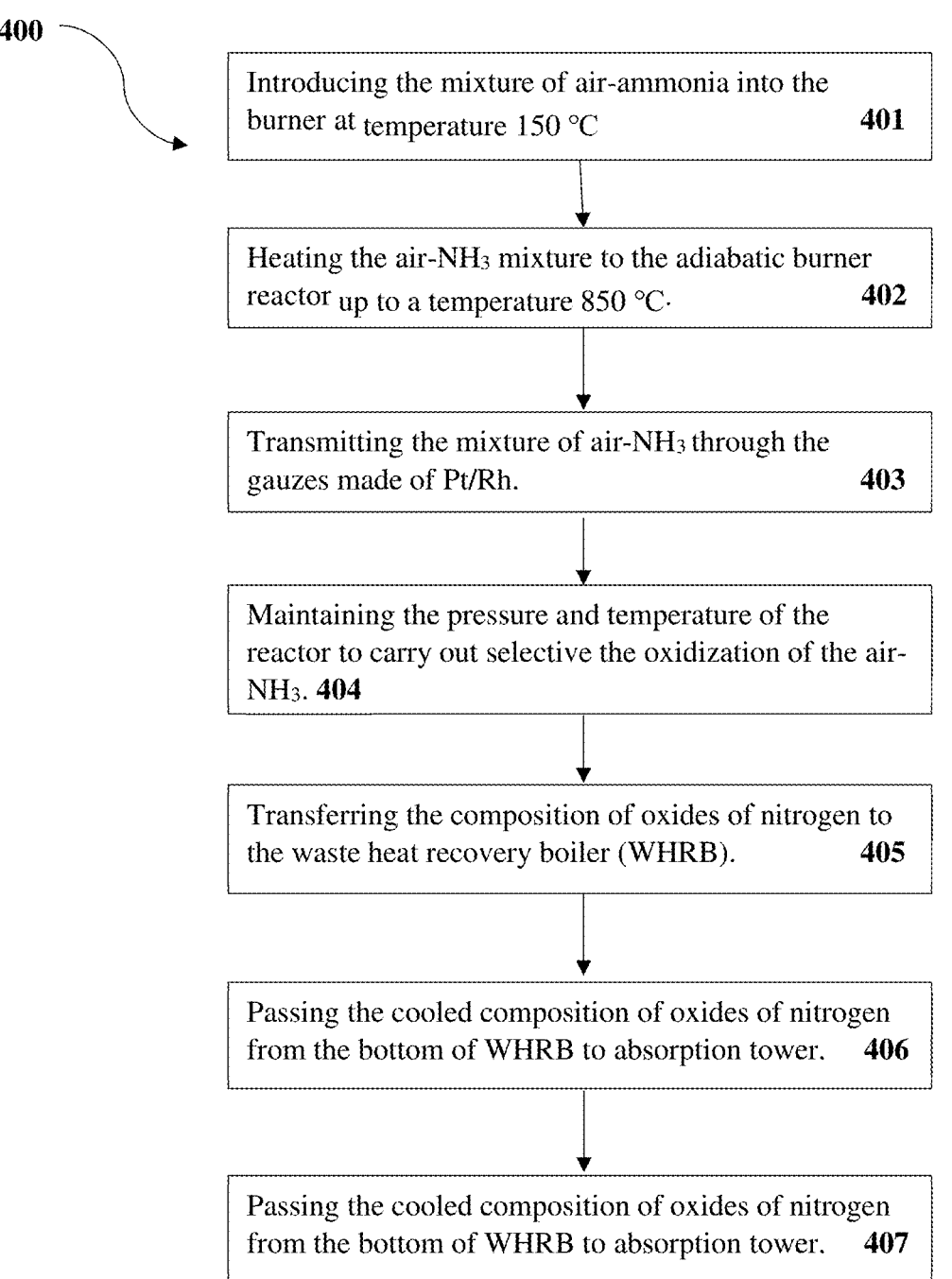

Introducing the mixture of air-ammonia into the burner at temperature 150 °C     401

Heating the air-NH₃ mixture to the adiabatic burner reactor up to a temperature 850 °C.     402

Transmitting the mixture of air-NH₃ through the gauzes made of Pt/Rh.     403

Maintaining the pressure and temperature of the reactor to carry out selective the oxidization of the air-NH₃. 404

Transferring the composition of oxides of nitrogen to the waste heat recovery boiler (WHRB).     405

Passing the cooled composition of oxides of nitrogen from the bottom of WHRB to absorption tower.     406

Passing the cooled composition of oxides of nitrogen from the bottom of WHRB to absorption tower.     407

Figure 4

APPARATUS AND PROCESS FOR CONVERSION OF AMMONIA INTO OXIDES OF NITROGEN

CROSS-REFERENCE TO RELATED APPLICATIONS AND PRIORITY

The present application claims priority from Indian Patent Application no. 201921004836 filed on 7 Feb. 2019 and PCT application no. PCT/IB2020/050591 filed on 27 Jan. 2020.

TECHNICAL FIELD

The present disclosure relates to the conversion of ammonia gas into oxides of nitrogen.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

At present, the synthesis method of sodium nitrite comprises mixing of ammonia gas and air, oxidizing the mixture in an oxidation furnace, and cooling the steam produced by the waste heat boiler, and then absorbing the alkali solution through the absorption tower. However, the method has a disadvantage. To produce oxides of nitrogen, high input of steam and sodium salts are required. However, for such high input of the constituents, the yield of the reaction is low. Therefore, to provide such input, high investment is required, but obtaining low yield for the same may pose as a drawback.

Therefore, it is necessary to develop an apparatus for increasing the yield of the oxides of the nitrogen and thus formed the genesis of this subject.

SUMMARY

Before the present system and its components are described, it is to be understood that this disclosure is not limited to the particular system and its arrangement as described, as there can be multiple possible embodiments which are not expressly illustrated in the present disclosure. It is also to be understood that the terminology used in the description is for the purpose of describing the particular versions or embodiments only and is not intended to limit the scope of the present application. This summary is not intended to identify essential features of the claimed subject matter nor is it intended for use in detecting or limiting the scope of the claimed subject matter.

The present disclosure describes a process and apparatus for the conversion of ammonia gas into oxides of nitrogen to produce sodium nitrite with high yield content.

The present invention relates to an apparatus for conversion of ammonia into oxides of nitrogen, wherein the apparatus comprises an adiabatic burner configured to carry out the oxidation of a mixture comprising air and ammonia, at a predefined pressure and temperature. Further, the apparatus may comprise a plurality of nozzles to supply the reagents necessary to carry out the oxidation of the air-ammonia mixture. Further, the apparatus may comprise at least three pairs of catalytic gauzes enabled to carry out efficient oxidation of the air-ammonia mixture to selectively form nitrogen dioxide. Further, the apparatus may comprise at least one waste heat recovery boiler (WHRB) equipped with the burner, enabled to saturate the oxides of nitrogen by reducing the temperature of the oxides of nitrogen. Further, the apparatus comprises at least one absorption tower unit enabled to absorb the saturated nitrogen dioxide in an alkali media for selective formation of sodium nitrite.

In one embodiment, the process for conversion of ammonia into oxides of nitrogen is disclosed. The method may comprise introducing the mixture of air-ammonia gas into the adiabatic burner. Further, the method may comprise heating the air ammonia mixture in the burner at a pre-defined temperature to carry out oxidation process using catalytic gauzes made of Platinum/Rhodium, wherein platinum is 90-95% and rhodium is 5-10% of the total alloy composition. The process further comprises maintaining, the required pressure and temperature of the adiabatic burner to carry out the selective oxidation process, wherein the oxidation process is carried out at a predetermined pressure and a pre-determined temperature and for a pre-determined time period to selectively obtain nitrogen dioxide ($NO_2$). Further, the process comprises transferring the composition of oxide of nitrogen (nitrogen dioxide ($NO_2$) to the waste heat recovery boiler (WHRB) to saturate and cool the composition to a set temperature, wherein the temperature of the composition may be cooled to a pre-determined temperature. Further, the method comprises selective formation of nitrogen dioxide ($NO_2$) transferred from the bottom of the WHRB to absorption towers to selectively form a sodium nitrite by absorbing in alkali medium.

BRIEF DESCRIPTION OF FIGURES

The detailed description is described with reference to the accompanying Figures. In the Figures, the left-most digit(s) of a reference number identifies the Figure in which the reference number first appears. The same numbers are used throughout the drawings to refer like features and components.

FIG. 4 illustrates a process 400 for the conversion of air-ammonia gas into oxides of nitrogen, in accordance with embodiments of the present subject matter.

DETAILED DESCRIPTION

Before the present apparatus and its components are described, it is to be understood that this disclosure is not limited to the particular apparatus and its arrangement as described, as there can be multiple possible embodiments which are not expressly illustrated in the present disclosure. It is also to be understood that the terminology used in the description is for the purpose of describing the particular versions or embodiments only and is not intended to limit the scope of the present application. This summary is not intended to identify essential features of the claimed subject matter nor is it intended for use in detecting or limiting the scope of the claimed subject matter.

The present disclosure relates to a field of oxidation of ammonia gas into oxides of nitrogen. The oxidation reaction of the mixture of air and ammonia gas may be carried out on the screens or gauzes supported in the middle of the adiabatic burner reactor. The burner may be of two types, namely a single burner and a double burner, which may provide an increased yield of the oxidized nitrogen compounds.

Figure 1:
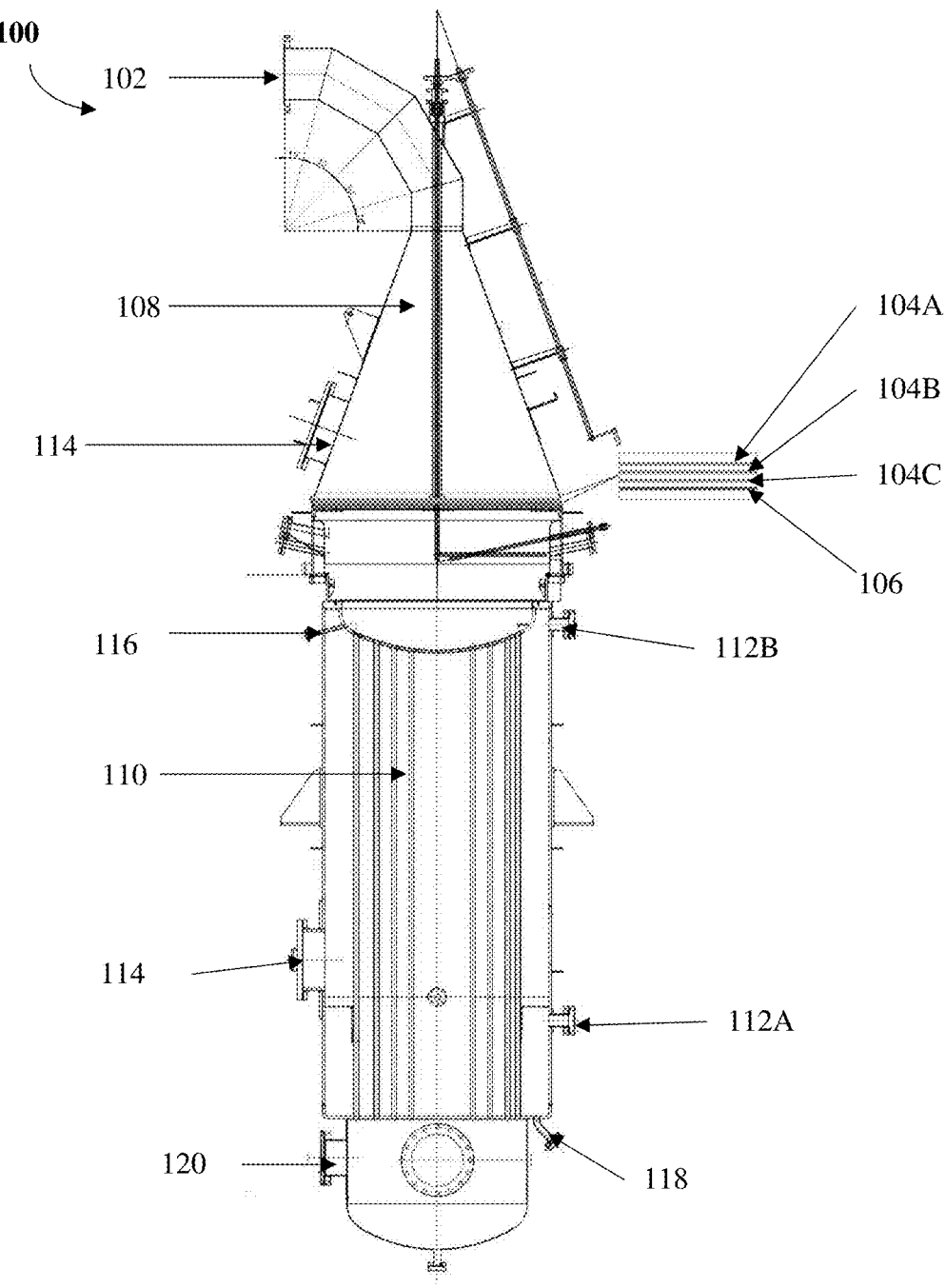
FIG. 1 illustrates a burner and WHRB assembly 100, in accordance with an embodiment of the present subject matter.

Now referring to FIG. 1, a schematic representation adiabatic burner reactor and the waste heat recovery boiler (WHRB) assembly 100 is illustrated, in accordance with an embodiment of the present disclosure. The assembly may comprise a conical shape type adiabatic burner 108, wherein the conical shape type adiabatic burner 108 further comprises an inlet 102.

Further, the adiabatic burner reactor and the waste heat recovery boiler (WHRB) assembly 100 comprises a waste heat recovery boiler 110, wherein the waste heat recovery boiler 110 further comprises a water condensate inlet 112A, and a steam outlet 112B, configured for supplying water condensate and transmitting the generated steam from the waste heat recovery boiler 110. Further, the waste heat recovery boiler 110 may comprise a blow down outlet 118 configured for removing solid residue deposited on the bottom of the waste heat recovery boiler 110. Further, the waste heat recovery boiler may comprise an outlet 120 configured to release cooled-down gases from the waste heat recovery boiler (WHRB) 110.

Further, the adiabatic burner reactor and the waste heat recovery boiler (WHRB) assembly 100 may comprise a plurality of platinum-rhodium alloy gauzes 104A, 104B, 104C and a support supporting screen 106 for platinum-rhodium alloy gauzes 104A, 104B, and 104C. Further, the adiabatic burner reactor and the waste heat recovery boiler (WHRB) assembly 100 may comprise a plurality of man-holes 114 enabled for maintenance engineering during shut-down of the adiabatic burner reactor and the waste heat recovery boiler (WHRB). Further, the adiabatic burner reactor and the waste heat recovery boiler (WHRB) assembly 100 may comprise a thermocouple 116 configured for measuring reactor temperature of the waste heat recovery boiler (WHRB) assembly 100.

In one embodiment, the conical shape type adiabatic burner 108 may comprise an inlet 102, wherein the inlet 102 may be configured to supply the mixture of air and ammonia ($NH_3$) at a temperature between 140-170° C., wherein the mixture of air and ammonia ($NH_3$) may be heated to a temperature of 850-950° C. which may initiate catalytic oxidation of the mixture of air and ammonia ($NH_3$). In one embodiment, the length of the internal diameter of the burner and the length of the cone may be within a predefined ratio of 5:6.

In one embodiment, the internal diameter of the conical shape type adiabatic burner 108 and the length of the cone may be designed in the ratio 5:6, i.e. for the internal diameter of 300 mm of the conical shape type adiabatic burner 108, the length of the cone may be 360 mm. Preferably, for the current process, the internal diameter of the conical shape type adiabatic burner 108 may be within a range of 1500-1600 mm, accordingly, the length of the cone may be within a range of 1800-1900 mm.

In one embodiment, the conical shape type adiabatic burner 108 may be connected to the plurality of platinum-rhodium gauzes 104A, 104B and 104C to form an adiabatic burner reactor. Further, the plurality of platinum-rhodium gauzes 104A, 104B and 104C may be configured to act as a catalyst bed for the oxidation of the mixture of air and ammonia ($NH_3$), wherein the mixture of air and ammonia ($NH_3$) may be oxidized to form oxides of nitrogen in gaseous form.

In one embodiment, the adiabatic burner reactor and the waste heat recovery boiler (WHRB) assembly 100 may comprise vertical shell and tube type waste heat recovery boiler 110, which may comprise 331 tubes, the water condensate inlet 112A, and the steam outlet 112B, corresponding to each length of the tube. In one embodiment the length of the tube may be 3800-4200 mm, preferably 4000 mm and with diameter 29-32 mm, preferably 31.75 mm. Further, the internal diameter of the shell may be 1900-2100 mm, preferably 2000 mm, corresponding to steam generation which may range between 1930-1950 kg/hr.

In one embodiment, the apparatus configured for conversion of ammonia into oxides of nitrogen may comprise the adiabatic burner reactor and the waste heat recovery boiler (WHRB) assembly 100, wherein the assembly 100 may comprise at least two adiabatic burner reactor and the waste heat recovery boiler (WHRB) configured to generate high yield of oxides of nitrogen and more particularly nitrogen dioxide ($NO_2$).

In one embodiment, the waste heat recovery boiler (WHRB) 110 may be configured for extracting heat from the oxides of nitrogen formed in the adiabatic burner reactor, wherein the extracted heat may convert the inlet water condensate to steam. Further, the oxides of nitrogen formed in the adiabatic burner reactor may be transmitted to the waste heat recovery boiler (WHRB) 110, wherein the waste heat recovery boiler (WHRB) 110 is a vertical shell and tube type heat exchanger, configured to cool the oxides of nitrogen from 850-950° C. to 200-250° C., wherein the oxides of nitrogen along with other constituent of gas may be transmitted in a tube surrounded by the water condensate. Further, due to the temperature variation between the oxides of nitrogen and the water condensate may result exchange of heat, thereby cooling the oxides of nitrogen from 850-950° C. to 200-250° C. and converting the water condensate to steam. Further, the cooled oxides of nitrogen may be further processed to selectively to form sodium nitrite and sodium nitrate.

Figure 2:
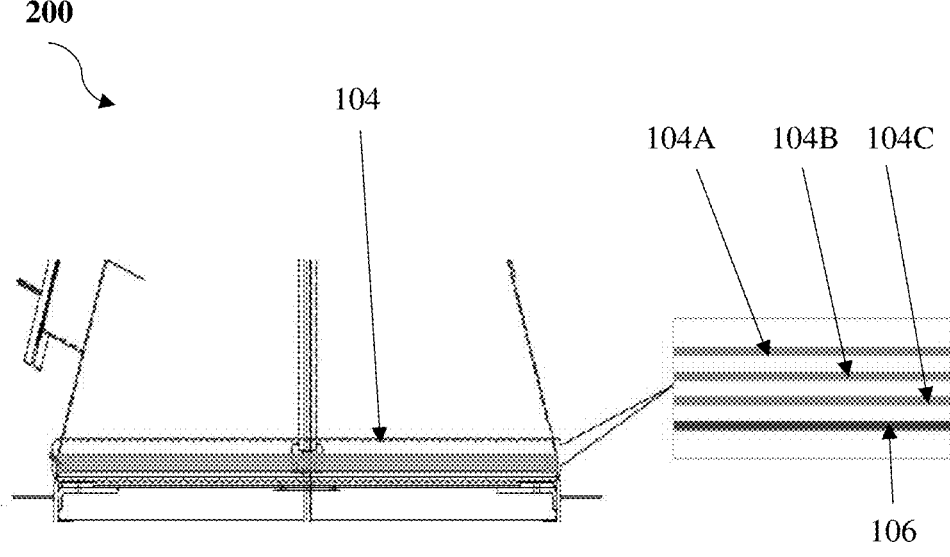
FIG. 2 illustrates a plurality of platinum-rhodium gauzes 200, in accordance with an embodiment of the present subject matter.

Now, referring to FIG. 2, a plurality of platinum-rhodium gauzes 200 is illustrated, in accordance with an embodiment of the present subject matter. Further, the plurality of platinum-rhodium gauzes 200 may comprise a set of gauzes comprising 6 gauzes, wherein the platinum-rhodium gauzes 200 may be arranged as 3 pairs 104A, 104B, and 104C, wherein each pair may comprise at least two platinum-rhodium gauzes. Further, the diameter of the gauzes may be within a range of 1600-1700 mm and the material of manufacture of the gauzes may be platinum/rhodium. The composition of the gauzes may include 80-95% of platinum and 5-20% of rhodium, preferably 90-95% of platinum and 5-10% of rhodium, and more specifically 95% platinum and 5% rhodium.

In one embodiment, the platinum-rhodium gauzes 200 may be configured to act as a catalyst bed for the oxidation of the mixture of air and ammonia ($NH_3$), wherein the mixture of air and ammonia ($NH_3$) may be oxidized to form oxides of nitrogen in gaseous form. Further, the platinum-rhodium gauzes 200 may be set at a temperature between 850° C. to 950° C., which may be desired for catalytic oxidation of the mixture of air and ammonia ($NH_3$).

Figure 3:
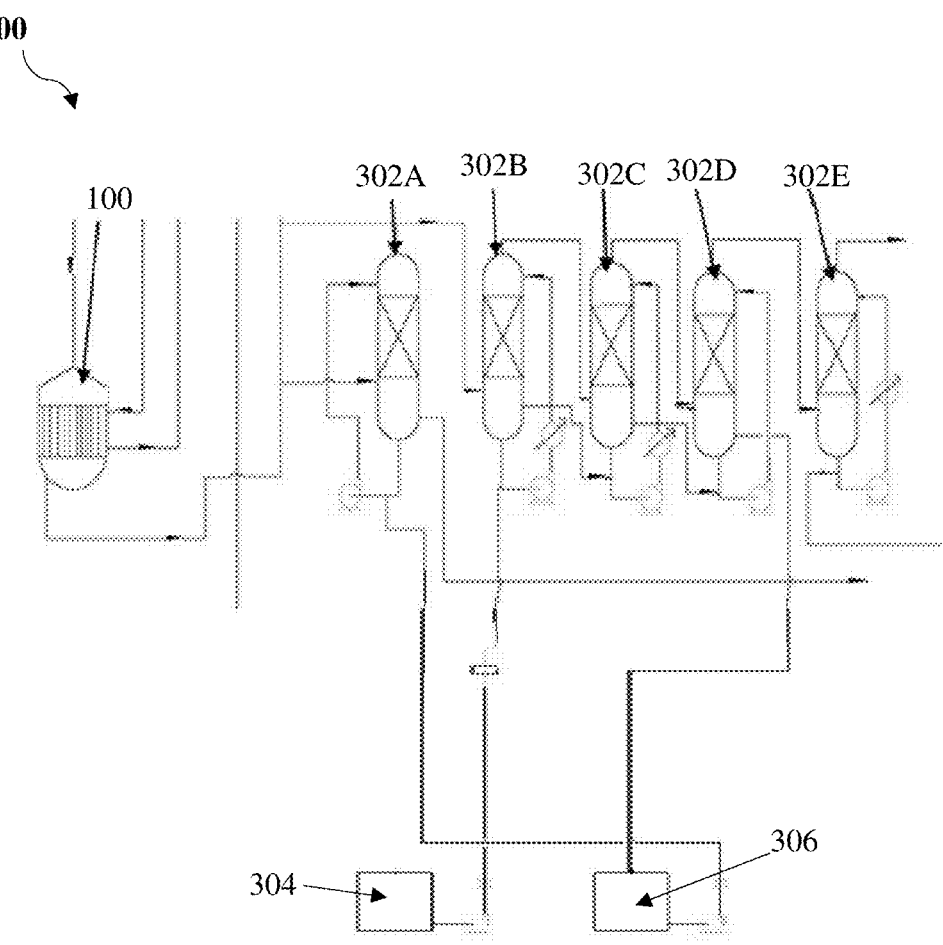
FIG. 3 illustrates a circuitry 300 of absorption of oxides of nitrogen, in accordance with embodiments of the present subject matter.

Now, referring to FIG. 3, the circuitry 300 of absorption of oxides of nitrogen is illustrated, in accordance with embodiments of the present subject matter. As seen, the circuitry 300 comprises a plurality of absorption towers 302A, 302B, 302C, 302D and 302E, a surge tank 306, an alkali (NaOH) tank 304.

In one embodiment, the oxides of nitrogen produced in the adiabatic burner reactor and the waste heat recovery boiler (WHRB) assembly 100 may be transferred to the plurality of absorption towers 302B, 302C, 302D and 302E. Also, some portion of the oxides of nitrogen may be transferred separately to 302A. Further, the absorption towers 302B, 302C, 302D and 302E may be configured to receive an alkali media, preferably Sodium Hydroxide (NaOH) to enable the absorption of the oxides of nitrogen in the alkali medium. Further, the saturated nitrogen dioxide absorbed in alkali medium may be further transferred to the surge tank 306, wherein the surge tank 306 enables the storage of saturated nitrogen dioxide absorbed in alkali medium. Further, the surge tank transfers the saturated nitrogen dioxide absorbed in alkali medium to the absorption tower 302A, for selective production of Sodium Nitrite Liquor. Further, the Sodium Nitrite Liquor may be transferred to an evaporation column (not shown in figure) to obtain Sodium Nitrite crystals. The process equation may be depicted as:

$$NO+NO_2+2\ NaOH\rightarrow 2NaNO_2+H_2O$$

In one implementation, the catalytic oxidation of ammonia may be described by the following reactions:
1. Main Reactions:

$$NH_3+5O_2\rightarrow 4NO+6H_2O \tag{A}$$

$$2NO+O_2\rightarrow 2NO_2 \tag{B}$$

$$4NH_3+6O_2\rightarrow 2NO+2NO_2+6H_2O$$

2. Side Reactions:

$$4\ NH_3+3\ O_2\rightarrow 2\ N_2+6\ H_2O$$

$$2\ NH_3\rightarrow N_2+3\ H_2$$

$$2\ NH_3+2\ O_2\rightarrow N_2O+3\ H_2O$$

$$4NH_3+6\ NO\rightarrow N_2+6\ H_2O$$

For above process, the flow of ammonia may be calculated as:

$$NH_3\ Flow=\left(\frac{Air\ flow}{22.4\times 10}\right)\times(Operator\ ratio)\times 17\ kg/hr$$

For example, at air flow of 9000 m³/hr, and operator ratio set to 0.8, substituting the values in the above equation, one can derive the desired NH₃ flow of 546.4 kg/hr.

Also, for the selection of proper mesh size of platinum/rhodium gauzes for catalytic oxidation, M A Shah, D Roberts. *Chemical Reaction Eng II. ACS Adv in Chem Ser*133: 259, 1974, illustrates an empirical correlation for $j_D$ factor, which is an analogy used in mass transfer calculation for a firstorder reaction. The correlation may be described as the dependency of $j_D$ factor on Reynolds number Re, illustrated as:
1. For 5<Re, γ<245, $$J_{D,\gamma}=0.644\ (Re,\gamma)^{-0.57} \tag{1}$$

2. Now, for the first order reaction, $-u_odC=K_cCda$, $da=a'dn$
Integrating the above relation, we get $$\ln\left(\frac{C_o}{C}\right)=\ln\left(\frac{1}{1-x}\right)=\frac{k_ca'n}{u_o} \tag{2}$$

Wherein
γ=no. of wires per unit length
x=fraction of air-ammonia converted to $NO_2$
$C_o$=Initial composition of gas
C=Final Composition of gas
α'=external area of gauze per unit cross section=3.959
$K_c$=mass transfer coefficient per unit area=112.571 cm/s n=number of gauzes=6
3. Further, the wires per unit length of the Pt/Rh gauze may be calculated as $$\gamma=(1-Nd)^2 \tag{3}$$

Where diameter of the wire in mesh
d=0.06 mm number of gauzes N=6
Now, for the above conversion,
Schmidt Number $S_c$=0.658
Also, $S_c^{2/3}$=0.757
Gas Viscosity, $\mu_g$=0.0435 cP=0.000435 kg/m/s
Density of the gas=0.376 kg/m³
Velocity of gas, $u_o$=2.33 m/s $$Reynolds\ number,\ Re=\frac{2.33\times 0.376\times 0.006}{0.000435}=12.07$$

Now, Substituting the values of d, N in equation (3), we get $$\gamma=0.137$$

Further, the value of (Re, γ) is 88.3536
Now, substituting the value of (Re, γ) in equation (1), we get, $$j_{D,\gamma}=0.05006$$

Now, substituting the values of $K_c$, a', and $u_o$ in equation (2), $$We\ get\ \ln\left(\frac{1}{1-x}\right)=1.17\ n$$

For solving for x at n=6, we get x=0.92, wherein x=0.92 signifies 92% of air-ammonia gas converted to $NO_2$.

Now, referring to FIG. 4, a process 400 for the conversion of air-ammonia gas into oxides of nitrogen is depicted, in accordance with embodiments of the present subject matter.

As shown in FIGS. 1 and 4, at step 401, the mixture of air-ammonia may be introduced to the adiabatic burner 108 through the inlet 102 positioned at the top of the adiabatic burner 108 which may comprise a conical geometry.

At step 402, the mixture of air ammonia passed through the inlet of the adiabatic burner 108 may be heated up to a temperature between 850° C.-950° C. to initiate the catalytic oxidation of air ammonia mixture.

At step 403, the air-NH₃ mixture may be transmitted through the pairs of gauzes 104A 104B and 104C made of Platinum (Pt)/Rhodium (Rh) Alloy. In one implementation, the screens/gauzes may act as a catalyst bed for carrying out the oxidation of the air-NH₃ mixture. In one embodiment, the catalytic gauzes 104A 104B and 104C are supported in the middle of the reactor by supporting screens 106. The number of gauzes attached into the adiabatic burner 108 may comprise 4 to 8 gauzes, preferably 6 gauzes in pairs of two. In one embodiment for a double burner reactor, the number of gauzes used in each burner may be of 3 pairs of 2 gauzes each.

At step 404, the temperature and pressure of the adiabatic burner 108 may be maintained in a predefined range of 850° C.-950° C. and 1-4 bar respectively to selectively oxidize and conversion of the mixture of air-ammonia to oxides of nitrogen and more specifically to form nitrogen dioxide (NO$_2$).

At step 405, the oxides of nitrogen may be transferred to the waste heat recovery boiler (WHRB) 110, wherein the temperature of oxides of nitrogen may be reduced from 950° C. to 200° C. In one embodiment, the WHRB 110 is a vertical shell and tube type boiler, which may be used to extract heat from the oxides of nitrogen formed during catalytic oxidation of air-ammonia mixture to cool down the oxides of nitrogen from 850-950° C. to 200-250° C., and to specifically obtain NO$_2$ gas.

At step 406, the cooled oxides of nitrogen (NOx) are discharged from the outlet 120 of the WHRB 110, wherein the oxides of the nitrogen may be passed to the absorption tower for saturation and concentrating the NO$_2$ (Nitrogen dioxide) gas.

At step 407, selective production of sodium nitrite may take place by absorbing the saturated oxides of nitrogen, more specifically Nitrogen dioxide (NO$_2$) gas in absorption towers 302A, 302B, 302C, 302D and 302E.

In one implementation, the catalytic oxidation of ammonia may be carried out at a predefined pressure range of 1-4 bar in the adiabatic reactor burner. The temperature of the adiabatic reactor burner comprising catalyst bed or gauzes 204 may be maintained between 850 to 950° C. In one embodiment, the pressure inside NH$_3$ feed may range 2 to 10 bar and at a flow rate which may range 200 to 1200 kg/h. The feed rate of air may range 8600-9460 nm$^3$/h and that of the NH$_3$ gas may be 988-1090 nm$^3$/h. Further, the oxides of nitrogen comprises NO, NO$_2$, and N$_2$O, having a flow rate ranging 580-590 kg/hr, 900-910 kg/hr, 19-20 kg/hr respectively is transferred to the absorption tower. Further, the Nitrogen dioxide (NO$_2$) gas is absorbed in an alkali medium to obtain high yield of SNI liquor having a flow rate of 2700-2750 kg/hr and 38-40% w/w composition.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated but is to be accorded the widest scope consistent with the principles and features described herein.

The foregoing description shall be interpreted as illustrative and not in any limiting sense. A person of ordinary skill in the art would understand that certain modifications could come within the scope of this disclosure.

The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

I claim:

1. An apparatus for conversion of ammonia to sodium nitrite comprising:

a double burner with two adiabatic burners (108) used to carry out an oxidation of an air-ammonia mixture to form oxides of nitrogen, wherein each adiabatic burner (108) is enabled to maintain a pressure range between 1-4 bar and a temperature between 850° C.-950° C., wherein each adiabatic burner (108) has an internal diameter within a range of 1500-1600 mm and a length within a range of 1800-1900 mm;

each adiabatic burner equipped with an inlet (102) configured to supply an air-ammonia mixture at a temperature between 140-170° C.;

each adiabatic burner comprising three pairs of catalytic gauzes (104A), (104B), (104C) made up of an alloy composition enabled to carry out the oxidation of the air-ammonia mixture, wherein the alloy composition consists of platinum in an amount of 95% of the alloy composition and rhodium in an amount of 5% of the alloy composition, wherein each gauze has a diameter in a range of 1600-1700 mm and comprises wires with a wire diameter of 0.06 mm;

a waste heat recovery boiler (WHRB) (110) equipped with each adiabatic burner (108), enabled to saturate the oxides of nitrogen by reducing the temperature of the oxides of nitrogen; and at least one absorption tower unit (302A), (302B), (302C), (302D), and (302E) enabled to absorb the saturated oxides of nitrogen in an alkali media for selective formation of sodium nitrite.

2. The apparatus as claimed in claim 1, wherein each adiabatic burner (108) has a conical geometry, and wherein a ratio of the internal diameter to the length of each adiabatic burner (108) is 5:6.

3. A process (400) of conversion of ammonia into sodium nitrite, wherein the process comprises: introducing, (401) an air ammonia mixture into a double burner with two adiabatic burners (108) at a temperature between 150° C.-170° C. to form oxides of nitrogen, wherein each adiabatic burner (108) has an internal diameter within a range of 1500-1600 mm and a length within a range of 1800-1900 mm, wherein each adiabatic burner is equipped with an inlet (102) configured to supply an air-ammonia mixture at a temperature between 140-170° C.;

heating, (402) the air ammonia mixture in each adiabatic burner (108) at a temperature up to 950° C. to carry out oxidation process;

transmitting, (403) the air-ammonia mixture through three pairs of catalytic gauzes (104A), (104B), (104C) of each adiabatic burner, made of an alloy composition, wherein the alloy composition consists of platinum in an amount of 95% of the alloy composition and rhodium in an amount of 5% of the alloy composition, wherein each gauze has a diameter in a range of 1600-1700 mm and comprise wires with a wire diameter of 0.06 mm;

maintaining, (404) a pressure between 1-4 bar and a temperature between 850° C.-950° C. of each adiabatic burner (108) for pre-determined time period to carry out an oxidation process of the air-ammonia mixture in presence of the three pairs of catalytic gauzes (104A), (104B), (104C) to selectively obtain oxides of nitrogen; transferring, (405) the oxides of nitrogen to a waste heat recovery boiler (WHRB) (110) to saturate and cool the oxides of nitrogen such that the temperature of the oxides of nitrogen is reduced from 950° C. up to 200° C.; passing, (406) the saturated oxides of nitrogen from the bottom of the WHRB to absorption towers (302A), (302B), (302C), (302D), and (302E); and forming, (407) selectively a sodium nitrite by absorbing the saturated oxides of nitrogen in an alkali medium.

4. The process as claimed in claim 3, wherein the gas flows into each adiabatic burner (108) at an inlet velocity between 15-20 m/s, wherein the gas is later oxidised to form the oxides of nitrogen.

5. The process as claimed in claim 3, wherein the gas flows into each adiabatic burner (108) at a rate 6200-6500 m$^3$/hr, wherein the gas is later oxidised to the form oxides of nitrogen.

\* \* \* \* \*